US00RE48366E

(19) United States
(12) Reissued Patent
Van Gorp et al.

(10) Patent Number: US RE48,366 E
(45) Date of Reissued Patent: Dec. 22, 2020

(54) CLEAN/BIOHAZARD TRANSPORTATION IDENTIFICATION TAG

(71) Applicants: Phillip Van Gorp, Ham Lake, MN (US); Samuel Curnow, Chanhassen, MN (US)

(72) Inventors: Phillip Van Gorp, Ham Lake, MN (US); Samuel Curnow, Chanhassen, MN (US)

(21) Appl. No.: 16/402,703

(22) Filed: May 3, 2019

Related U.S. Patent Documents

Reissue of:
(64) Patent No.: 9,870,724
Issued: Jan. 16, 2018
Appl. No.: 14/801,072
Filed: Jul. 16, 2015

U.S. Applications:
(62) Division of application No. 16/117,508, filed on Aug. 30, 2018, now abandoned, which is an application for the reissue of Pat. No. 9,870,724.

(60) Provisional application No. 62/025,217, filed on Jul. 16, 2014.

(51) Int. Cl.
*G09F 3/02* (2006.01)
*G09F 3/00* (2006.01)

(52) U.S. Cl.
CPC .... *G09F 3/0288* (2013.01); *G09F 2003/0222* (2013.01); *G09F 2003/0272* (2013.01)

(58) Field of Classification Search
CPC . G09F 3/10; G09F 3/0288; G09F 3/02; G09F 3/00; G09F 2003/0267; G09F 2003/0257; Y10T 428/149; Y10T 428/24851; Y10T 156/1052
USPC ..... 40/674; 604/403
See application file for complete search history.

(56) References Cited

U.S. PATENT DOCUMENTS 3,199,769 A * 8/1965 Hillman, II ..... B65D 27/04 206/831
3,993,814 A * 11/1976 Cavender ..... G09F 3/0289 206/813
4,446,182 A * 5/1984 Cavender ..... G09F 3/10 40/638
4,742,954 A * 5/1988 Shishido ..... B42D 15/0093 229/92.8
4,928,874 A * 5/1990 Henry ..... B42D 15/006 229/74
5,129,682 A * 7/1992 Ashby ..... B42D 5/025 281/5
5,254,381 A * 10/1993 Hoffmann ..... G09F 3/02 283/101
5,340,158 A * 8/1994 Bartl ..... B42D 15/006 229/921

(Continued)

*Primary Examiner* — Beverly M Flanagan
(74) *Attorney, Agent, or Firm* — Westman, Champlin & Koehler, P.A.

(57) ABSTRACT

A tag for positioning on containers for carrying item(s). The tag includes a base layer having a second status identifier that comprises a status identification symbol. The tag also includes a front layer having a top portion and a bottom portion and a removable tab connecting the top portion and the bottom portion. The bottom portion and the top portion are secured to the base layer. When the front layer is secured to the base layer, the front layer covers the second status identifier. The removable tab includes a first status identifier that is visible when the tab is retained to the front layer and, when the tab is removed, the second status identifier is visible.

30 Claims, 5 Drawing Sheets

(56) References Cited

U.S. PATENT DOCUMENTS 5,924,561 A * 7/1999 Baumgartner ..... G09F 3/10 206/63.3
6,035,568 A * 3/2000 Grosskopf ..... B65D 23/003 40/630
6,186,554 B1 * 2/2001 Raming ..... B42D 15/006 229/74
6,273,986 B1 * 8/2001 Egan ..... G09F 3/10 156/247
6,761,791 B2 * 7/2004 Arway ..... B42D 15/006 156/249
6,953,207 B2 * 10/2005 Raming ..... B42D 15/006 206/216
7,628,427 B2 * 12/2009 Adler ..... G09F 3/0289 215/365
7,891,490 B2 * 2/2011 Raming ..... B42D 15/006 206/459.5
8,096,418 B2 * 1/2012 Raming ..... B42D 15/006 206/459.5
8,496,110 B2 * 7/2013 Raming ..... B42D 15/006 206/459.5
8,950,783 B2 * 2/2015 Raming ..... B42D 15/006 283/103
2003/0141976 A1 * 7/2003 Dickinson ..... B32B 7/06 340/572.8
2008/0005949 A1 * 1/2008 Flynn ..... G09F 3/0288 40/674
2010/0139139 A1 * 6/2010 Flynn ..... G09F 3/0288 40/674
2011/0119978 A1 * 5/2011 Raming ..... B42D 15/006 40/638
2014/0059905 A1 * 3/2014 Raming ..... B42D 15/006 40/638
2014/0237873 A1 * 8/2014 Garay-Marrero ..... G09F 3/02 40/674
2015/0072097 A1 * 3/2015 Tobol ..... B31D 1/027 428/41.8
2015/0128466 A1 * 5/2015 Raming ..... B42D 15/006 40/638

* cited by examiner

CLEAN/BIOHAZARD TRANSPORTATION IDENTIFICATION TAG

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is based on and claims the benefit of U.S. provisional patent application Ser. No. 62/025,217, filed Jul. 16, 2014, the content of which is hereby incorporated by reference in its entirety.

BACKGROUND

The present disclosure relates to a tag that is attached to transportation carts and/or to hand held or other containers to identify, notify, label or inform whether the transportation cart or the hand held container is transporting clean/sterile item(s) or item(s) contaminated with or considered bio-hazardous material. More particularly, the present disclosure relates to a multi-layer tag that is utilized within a medical or health care providing facility to identify whether the transportation cart and/or the hand held container is transporting clean/sterile item(s) or item(s) contaminated with or considered bio-hazardous material.

As used herein, the term item(s) includes, but is not limited to, medical products, instruments and/or equipment.

Due to the configuration of many facilities, item(s) required for a procedure can be transferred within or out of the facility from a clean room or area to an area or room where a medical procedure is to be performed and back to a cleaning/sterile/general processing area. The item(s), whether clean or contaminated by a bio-hazardous material, are typically transported within a transportation cart or container through at least one area accessible to the public.

For purposes of this application, a bio-hazardous material is blood or other potentially infectious materials pursuant to CFR 1910.1030(a). If the bio-hazardous material comes into contact with health care personnel or the public, the potential exists for the transfer of a microorganism, such as bacteria or a virus, which can cause a short term or long term illness. The transfer of such a microorganism must be prevented to ensure the health of the health care personnel or the public.

Therefore it is imperative that the transportation cart or the container used to transport items through areas accessible to the public or other areas be identified as containing clean items or as containing items contaminated with a bio-hazardous material. When a transportation cart or container is identified as transporting an item contaminated by a bio-hazardous material, the public and/or staff are notified to avoid the transportation cart or hand held container. In fact, the Occupational Safety and Health Administration (OSHA) standard CFR 1910.10.1030(g)(9)(i)(B) requires such notification. However, the scope of the present disclosure is not limited to compliance with OSHA regulations and may be utilized to comply with the regulations of other agencies or entities.

Typically, items transferred within a health care facility are contained within a transportation cart, commonly referred to as a case cart. The case cart has wheels or casters for moving the case cart from one location to another location, such as from a room that stores sterile equipment to an operating room or procedure room and back to a sterile processing area. A case cart is typically constructed of steel, such as stainless steel, and has drawers or bins to contain the medical equipment. While a case cart is exemplary, the present disclosure is not limited to a case cart.

For instance, sterilized item(s) can be transported from a room that stores sterile item(s) to an operating room through areas that are accessible to the public, typically in a case cart. While sterile, the item(s) within the case cart poses no health risk to the public, and can be safely transported through areas that are accessible to the public.

However, once the item(s) has been used in a medical procedure or exposed to bio-hazardous material, the case cart used to transport the item(s) must be identified as containing the item(s) contaminated with the bio-hazardous material to minimize the possibility of exposure to such bio-hazardous materials. Therefore, the transfer of the contaminated item(s) poses a health risk to the public and/or staff within publicly accessible areas or any other areas. It should be noted that while a case cart is being discussed, the same issues arise when item(s) are transported in a hand held container, such as a bin with a lid.

A typical scenario includes the transportation of item(s) to and from a surgical procedure. The item(s) are cleaned/sterilized and transported to the operating or procedure room with a case cart. Because the case cart is clean and the item(s) are clean or sterile, the risk of any contamination of persons that could contact the item(s) are minimal However, after the medical procedure, such as a surgical procedure, the item(s) are contaminated with the patient's tissue and/or fluids, which are considered to be a bio-hazardous material. Even when transported in a case cart, a risk exists of exposing the public to the patient's tissue and/or fluid which is a bio-hazardous material. Risks of contaminating other clean/sterile items also exist. Identifying the case cart as containing item(s) contaminated with a bio-hazardous material aids in eliminating the risk of exposure to bio-hazardous materials.

SUMMARY

The present disclosure relates to a tag that is configured to be removably attached to a transportation cart or a container for transporting item(s) where the tag provides information and provides/states notice regarding the cleanliness status of item(s) within the transportation cart or the hand held container. The tag has a multi-layer construction. The tag includes a base layer having a front surface and a back surface. The front surface of the base layer includes a second status identifier indicating that the transportation cart or the hand held container is transporting dirty item(s) that is contaminated with a bio-hazardous material. The second status identifier includes the OSHA approved symbol for a bio-hazardous material. A top layer is secured to the front surface and covers the second status identifier. The top layer includes a first status identifier on the front surface indicating that the item(s) within the transportation cart or the hand held container are clean. The first status identifier is located on a tab that is defined by upper and lower perforated lines. A width of the front layer is less than a width of the base layer such that a sequence identifier for removing the tab is visible. When the tab is removed, the first status identifier is removed and the second status identifier is visible. The back surface of the base layer optionally can be coated with a pressure sensitive adhesive to which a removable backing layer can be attached.

The tab of the top layer that includes the status identifier related to the cleanliness of the item(s), which is typically designated as "CLEAN", also includes a color identifier, typically green, that assists in identifying the item(s) in the transportation cart or the hand held container as being clean. Once the item(s) are no longer used by the patient, on the patient, or for patient use, the tab is removed from the top layer which exposes the second status identifier related to the cleanliness of the item(s), which indicates that the item(s) is "DIRTY" meaning it cannot be reused without being cleaned. The second status identifier also includes the symbol for a bio-hazardous material that has been approved by OSHA pursuant to CFR 1910.10.1030(g)(9)(i)(B). The second status identifier has a second color that is different from the first and second colors where the second color is typically a fluorescent orange or orange/red color that has also been approved by OSHA pursuant to CFR 1910.10.1030(g)(9)(i)(C). People viewing the second status identifier will be notified that the transportation cart or the hand held container is transporting item(s) contaminated by a bio-hazardous material.

DETAILED DESCRIPTION

Figure 1:
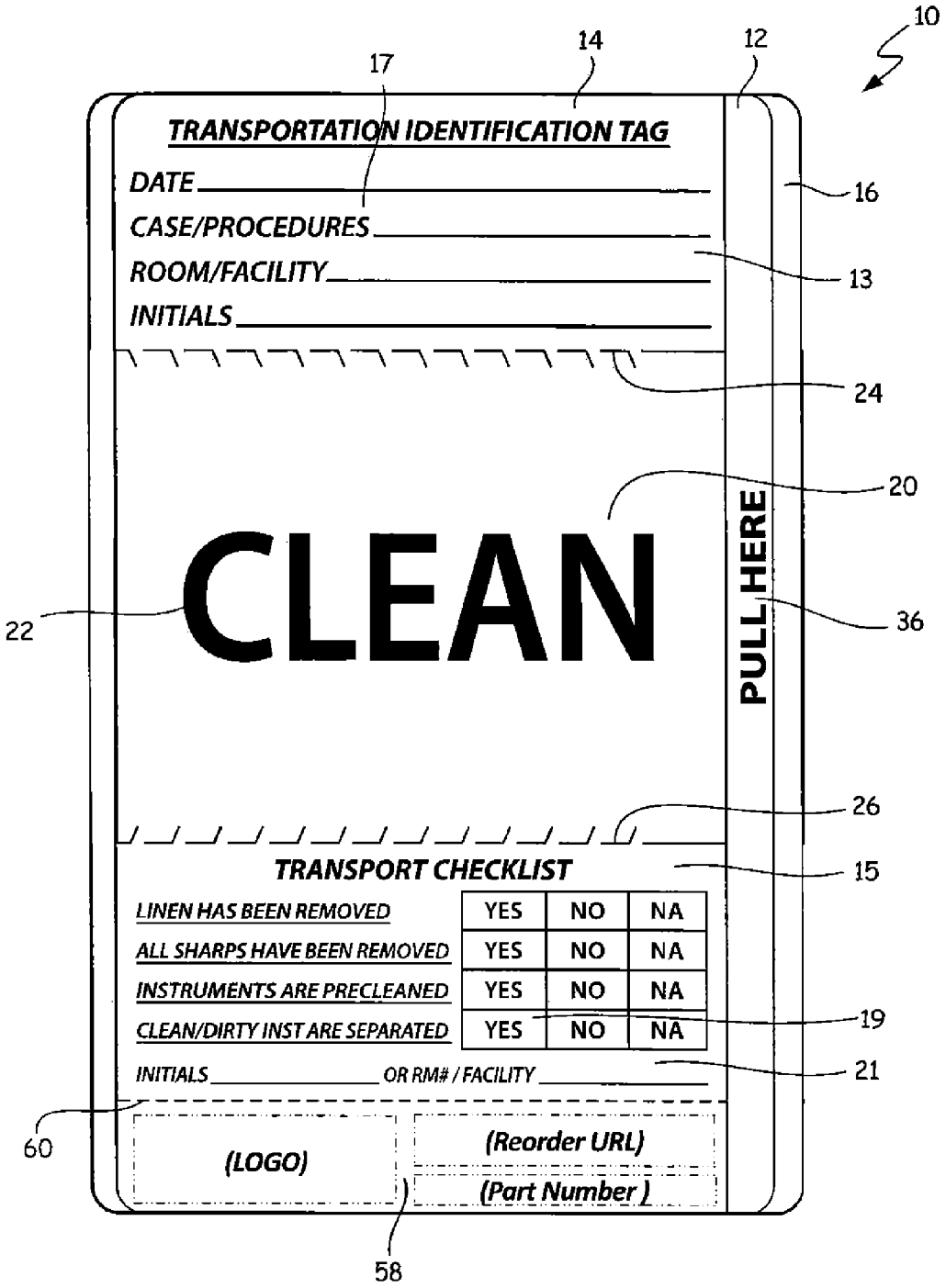
FIG. 1 is a top view of a status identification tag related to the cleanliness of item(s) within a transportation container with the "CLEAN" status identifier.

A status identification tag configured for utilization on a transportation cart or a hand held container for transporting item(s) is generally illustrated in FIG. 1 at 10. It should be noted that the same reference numerals are used in different figures for same or similar elements. The tag 10 has a multi-layer construction that includes a base layer 12, a front layer 14 and a backing layer 16. The base layer 12 and the front layer 14 include different status identifiers that allow the personnel or public at a facility to easily determine the cleanliness status of the item(s) within the transportation cart or the hand held container.

The tag 10 includes a pressure sensitive adhesive (PSA) coated on a back surface of the base layer 12. The backing layer 16 is removably secured to the PSA to prevent the tag 10 from adhering to other tags or other surfaces. The backing layer 16 can easily be peeled away from the base layer 12 with manual force such that the PSA is exposed and the tag 10 can be secured to the transportation cart or the hand held container for transporting the item(s). In the event that the tag 10 cannot be secured to the transportation cart or the hand held container with the PSA, an aperture can be formed through the layers 12, 14 and 16 and can be utilized along with a string or tie to secure the tag 10 to the transportation cart or the hand held container as a hang tag.

The front layer 14 includes a top portion 13 and a bottom portion 15 that are separated by a removable tab 20. The top portion 13 and the bottom portion 15 are secured to the base layer 12 with an adhesive. The removable tab 20 is defined by perforated lines 24 and 26 across a width of the front layer 14. The removable tab 20 includes a first status identifier 22 regarding the cleanliness of the item(s) within the transportation cart or the hand held container. In this instance the first status identifier is the word "CLEAN", which identifies the item(s) within the transportation cart or the hand held container as being clean and ready for use by a patient, on a patient or for a patient.

The first status identifier 22 regarding the cleanliness of the item(s) is also color coded to indicate that the item(s) is ready for use. In this instance the color is green is utilized, which is intended to provide a visual indication that the item(s) is fit for use, similar to that of a traffic light when green. Optionally, the top portion 13 and the bottom portion 15 may include no fields and may be blank.

The top portion 13 of the front layer 14 includes fields 17 to identify the date, case/procedures, the room and facility to which the item(s) within the transportation cart or the hand held container is to be delivered and the initials of the person transporting the item(s). The bottom portion 15 includes a checklist 19 to be optionally filled out prior to or after the transportation of the item(s). The bottom portion bottom portion also includes fields 21 to identify the room and/or facility and the initials of the person transporting the item(s) with the transportation cart or the hand held container.

While the fields 17, 19 and 21 are useful, they are exemplary of the types of fields that may be included on the top portion 13 and the bottom portion 15. Other fields are within the scope of the present disclosure.

Figure 2:
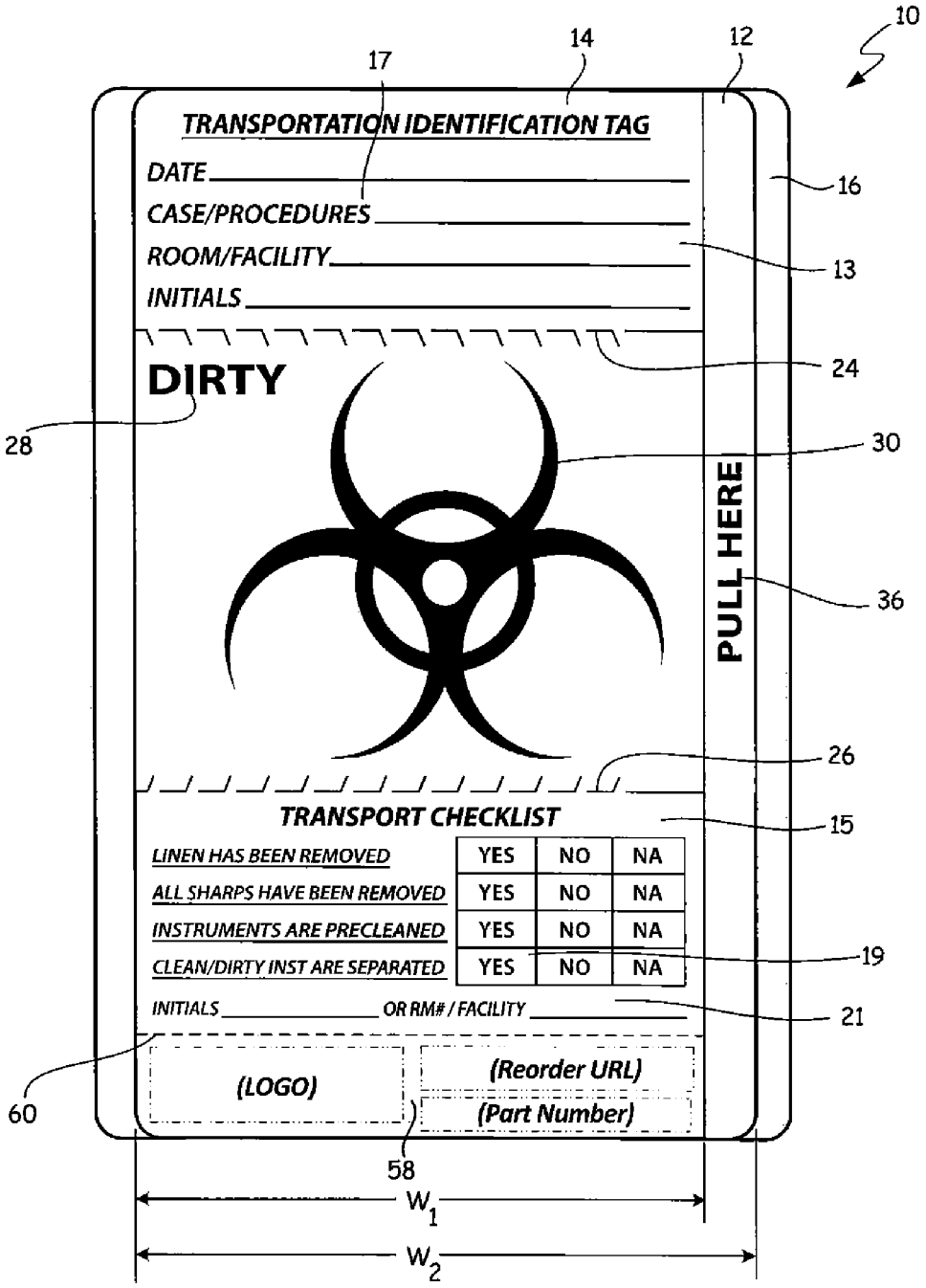
FIG. 2 is a top view of the status identification tag related to the cleanliness of item(s) within a transportation container with the "DIRTY" status identifier and having the bio-hazard symbol approved by OSHA.

Referring to FIG. 2, once the item(s) are contaminated and placed back into the transportation cart or the hand held container, the personnel removes the removable tab 20 utilizing manual force to tear the tab 20 away from the top layer 14 along the perforated lines 24 and 26. With the top removable tab 20 removed, a second status identifier 28 on the base layer 12 regarding the cleanliness of the item(s) within the transportation cart or the hand held container is exposed. The second status identifier 28 regarding the cleanliness of the item(s), in this instance "DIRTY" and also includes the OSHA approved symbol for a bio-hazardous material 30 pursuant to CFR 1910.10.1030(g)(9)(i)(B). The second status identifier 28 and the OSHA approved bio-hazardous material symbol 30 inform the personnel and the public that the item(s) is being transported in the transportation cart or the hand held container is contaminated with a bio-hazardous material.

The second status identifier 28 also is color coded to indicate that the item(s) is in use. In this instance, the color fluorescent orange or orange/red is utilized, which is intended to provide an indication that dangerous material is being transported and that caution is required. The fluorescent orange or orange/red color is approved by OSHA pursuant to CFR 1910.10.1030(g)(9)(i)(C). However, the present disclosure is not limited to compliance with OSHA regulations and may be modified to comply with other regulatory agencies' rules and regulations.

In the identification tag 10 shown in FIGS. 1 and 2, the front layer 14 has a width W1 (first width) that is less than the width W2 (second width) of a base layer 12. As such, an instructive identifier 36 that instructs how to remove the tab 20 is visible. It should be noted that, in order for instructive identifier 36 to be visible, only the tab 20 of front layer 14 needs to have a width W1 that is less that the width W2 of the base layer 12. Thus, in different embodiments, portions of the front layer 14 other than the tab 20 may have the same width (W2) as the base layer 12 or even have a width that is greater than W2. In this instance the instructive identifier 36 is the words "PULL HERE". In general, any suitable instructive identifier 36 may be used. While the instructive identifier 36 is illustrated, the instructive identifier is provided for convenience and is not required to utilize the cleanliness identification tag 10. Of course, in embodiments that do not include the instructive identifier 36, different widths for the base layer 12 and the front layer 14 may not be employed.

In FIG. 1, the tab 20 is substantially rectangular in shape and has four substantially straight sides with adjacent sides being unequal in length. As can be seen in FIG. 1, one of the longer sides of tab 20 is at a connection junction of the top portion 13 of the front layer 14 and the tab 20, and the other one of the longer sides of tab 20 is at a connection junction of the bottom portion 15 of the front layer 12 and the tab 20. In some embodiments, adjacent sides of tab 20 may be equal in length such that tab 20 is square shaped.

Figure 3:
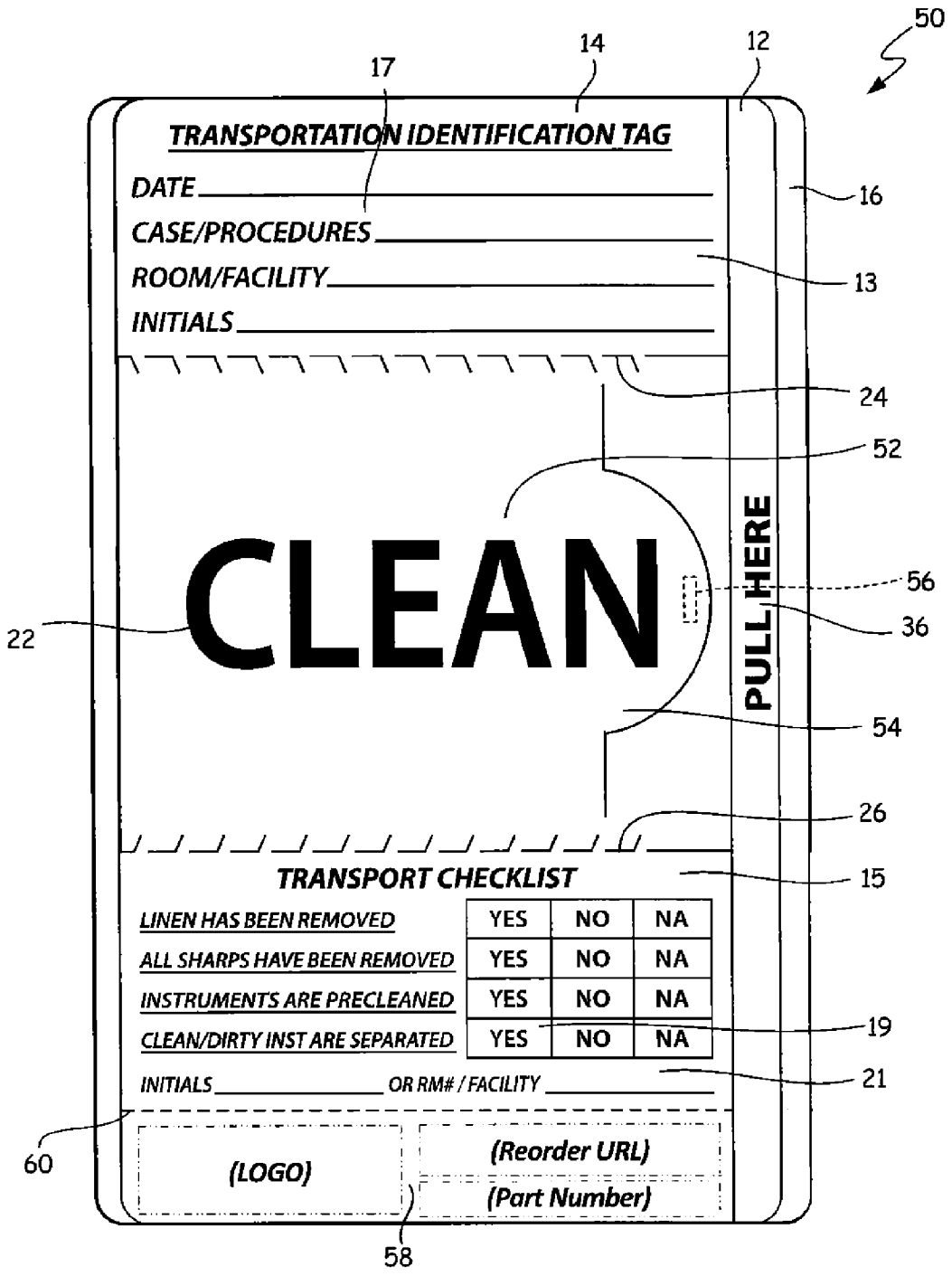
FIG. 3 is a top view of a status identification tag having a tab including the "CLEAN" status identifier and a pull-up flap.

FIG. 3 shows an embodiment of a tag 50, which is similar to the tag 10 (of FIG. 1), but includes a tab 52 that is shaped to enable easy gripping and removal. In the interest of brevity, a description of elements of the tag 50 that are substantially similar to elements of the tag 10 is not repeated in connection with FIG. 3. As can be seen in FIG. 3, a portion of the tab 52 is rectangular/square in shape. However, one side of the tab 52 includes a pull-up flap portion 54 that can be gripped between fingers of one hand and relatively easily be pulled in a direction away from the base layer 12. To form the pull-up flap 54, a portion of the rectangular tab 20 of FIG. 1 may be cut away or otherwise removed. In general, any suitable technique may be used to form the pull-up flap portion 54 of the tab 52. In the embodiment shown in FIG. 3, the pull-up flap portion 54 has a substantially semi-circular or semi-elliptical shape. However, in different embodiments, the pull-up flap portion 54 may be of any suitable shape or size. Further, the pull-up tab 54 may be located on a different side of the tab 52 than that shown in FIG. 3. Additionally, in some embodiments, multiple pull-up flaps 54 may be included in the single tab 52.

In some embodiments, the pull-up flap 54 may include one or more roughness-enhancing features 56 to help ensure that friction between the fingers and the pull-up flap 54 is sufficient to prevent slipping. The one or more roughness-enhancing features 56 may include a suitable roughness-enhancing coating or roughness-enhancing layer on one or both sides of the pull-up flap 54. It should be noted that the roughness-enhancing layer/coating 56 may be excluded from portions of the tab 52 other than the pull-up flap 54.

In some embodiments, tags such as 10 (of FIGS. 1 and 2) and 50 (of FIG. 3), may include a tag-reordering-information portion 58. As can be seen in FIGS. 1, 2 and 3, a front surface of the tag-reordering-information portion 58 may include website information of the tag seller and a tag identifier or part number, which identifies a particular type of tag to be ordered. Additionally, other information such as a logotype of the tag seller may be included on the front surface of the tag-reordering-information portion 58. In some embodiments, the tag-reordering-information portion 58 may be bi-layered and removably attached to the bottom portion 15 of the front layer 14 and to a bottom of the base layer 12 along a perforated line 60. In other embodiments, tag-reordering-information portion 58 may include a single layer that is removably attached to either the bottom portion 15 of the front layer 14 or to the bottom of the base layer 12 along the perforated line 60. Personnel may utilize manual force to tear the tag-reordering-information portion 58 away from the bottom portion of the front layer 14 and/or the bottom of the base layer 12 along the perforated line 60.

In some embodiments, a back surface of the tag-reordering-information portion 58 is not coated with any adhesive and therefore is not removably attached to the backing layer 16. The unattached portion allows personnel to lift the portion from the surface to allow for a better grasp to remove the base layer 12 from the surface.

In some embodiments, the tag 10, 50 may include a tag-hanging portion (not shown) above the fields 17 of the top portion 13 of the front layer 12. The tag-hanging portion may include a groove or hole (not shown) for hanging the tag 10, 50. The groove or hole may be sized to fit around a handle or any other suitable portion of the transportation cart or the hand held container. Alternatively, as indicated earlier, suitable ties (for example, wire ties, elastic loops, plastic ties, string ties, etc.) may be inserted into the hole for securing the tag 10, 50 to the transportation cart or the hand held container.

Once the contaminated item or items are transported to the final/proper location for cleaning, the tag 10, 50 may be removed from the transportation cart or the hand held container. The tag, 10, 50 may then be suitably discarded.

It is also contemplated that a permanent base layer 12 can be utilized having the second status identifier 28 and the OSHA approved bio-hazardous material symbol 30. The permanent base layer can be formed of a plastic or polymeric material that is impermeable to water and can be readily cleaned. Once the base layer 12 has been cleaned, a top layer 14 is adhered to the base layer to cover the second status identifier 28 while the first status identifier 20 would be visible.

It is also contemplated that the both status identifiers be located on the base layer and that two tear away tabs on the front layer be utilized to expose the desired status identifier. Whether utilizing a tag, which is a sticker, a hang tag or a plastic sheet, the present disclosure provides a communication tool to all who view the transportation cart or hand held container that the contents of the transportation cart or hand held container are either clean or contaminated with a bio-hazardous material.

Figure 4:
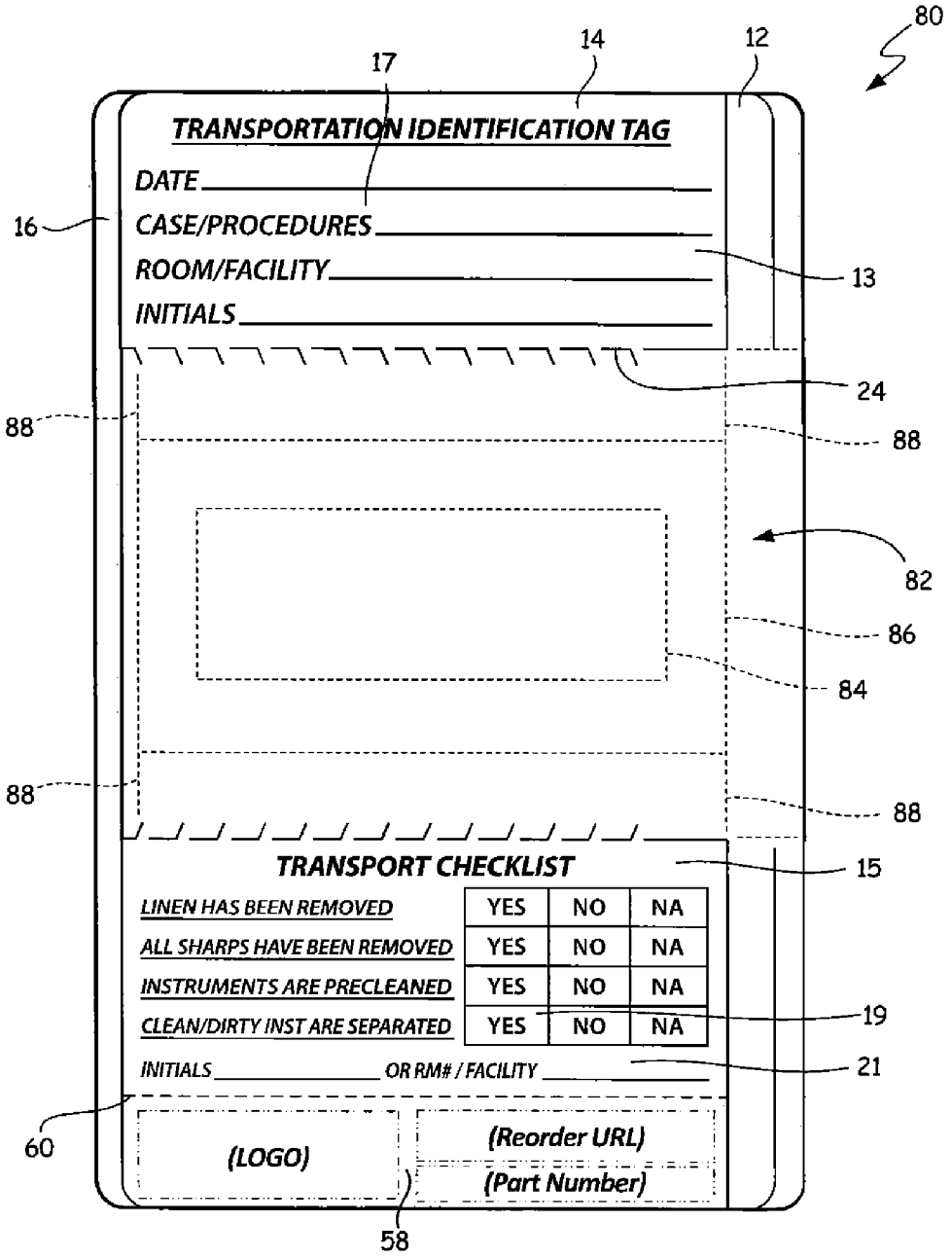
FIG. 4 is a top view of a status identification tag related to the cleanliness of item(s) in accordance with a general embodiment.

FIG. 4 illustrates a top view of a general embodiment of a tag 80 with cleanliness status identifiers. The tag 80 has a multi-layer construction that includes base layer 12, front layer 14 and backing layer 16. The front layer 14 includes top portion 13 and bottom portion 15. In the tag 80, a portion of the front layer 14, between the top portion 13 and the bottom portion 15, and a portion of base layer 12 form a cleanliness status identification portion 82. The portion 82 includes a plurality of cleanliness status identifiers 84 with at least one of the plurality of cleanliness status identifiers 84 included on the base layer 12. A tab 86 is included in the portion 82 for covering at least one of the plurality of cleanliness status identifiers 84 included on the base layer 12. The tab 86 may or may not include at least one of the plurality of cleanliness status identifiers 84. The portion 82 also includes connection sections 88 utilized for connecting the tab 86 to the top portion 13 and the bottom portion 15 of the front layer 14.

The plurality of cleanliness status identifiers 84 can comprise a first cleanliness status identifier and a second cleanliness status identifier. The base layer 12 may include at least one of the first cleanliness status identifier and the second status identifier. When the tab 86 is secured over the base layer 12, the tab 86 may cover one of the first cleanliness status identifier or the second cleanliness status identifier. The other one of the first cleanliness status identifier and the second cleanliness status identifier is visible. The visible cleanliness status identifier may be on the tab 86. The tab 86 may be removable to expose the covered cleanliness status identifier in a manner described earlier. Alternatively, both the first cleanliness status identifier and the second cleanliness status identifier may be on the base layer 12 and the tab 86 may be sized to cover only one of the cleanliness status identifiers 84. Here, the connection sections 88 may include an adhesive the enables sticking/re-sticking of the tab 86 such that the tab 86 may be stuck/re-stuck in at least a first location where only the first cleanliness status identifier is covered and in a second location where only the second cleanliness status identifier is covered. Movement of the tab 20 between the first and second locations can also be provided by employing connection sections 88 that include holders with channels that allow for sliding the tab 20 between the first and second locations. The holders with channels may be formed of a plastic or polymeric material.

Utilizing the status identification tag 10, 50, 80 related to the cleanliness of an item(s) within transportation cart or hand held container of the present disclosure provides a communication tool between the personnel in the operating room/procedure room and sterile processing area regarding the cleanliness of the item(s). The fields 17, 19 and 21 on the tag 10 also ensure that the delivery of the item(s) with the transportation cart or hand held container is delivered to the proper location.

In the application, the designations "CLEAN" and "DIRTY" are utilized as the cleanliness designations 20 and 28, respectively. However other designations are also contemplated, including other words, indicia or symbols for the first status identifier 22 and a different word for the second cleanliness designation 28. Further, while the green color code is utilized as the background color for the first status identifier 22, it is also contemplated that other colors can be utilized or that no color code be utilized with the status identification tag 10, 50, 80.

Figure 5:
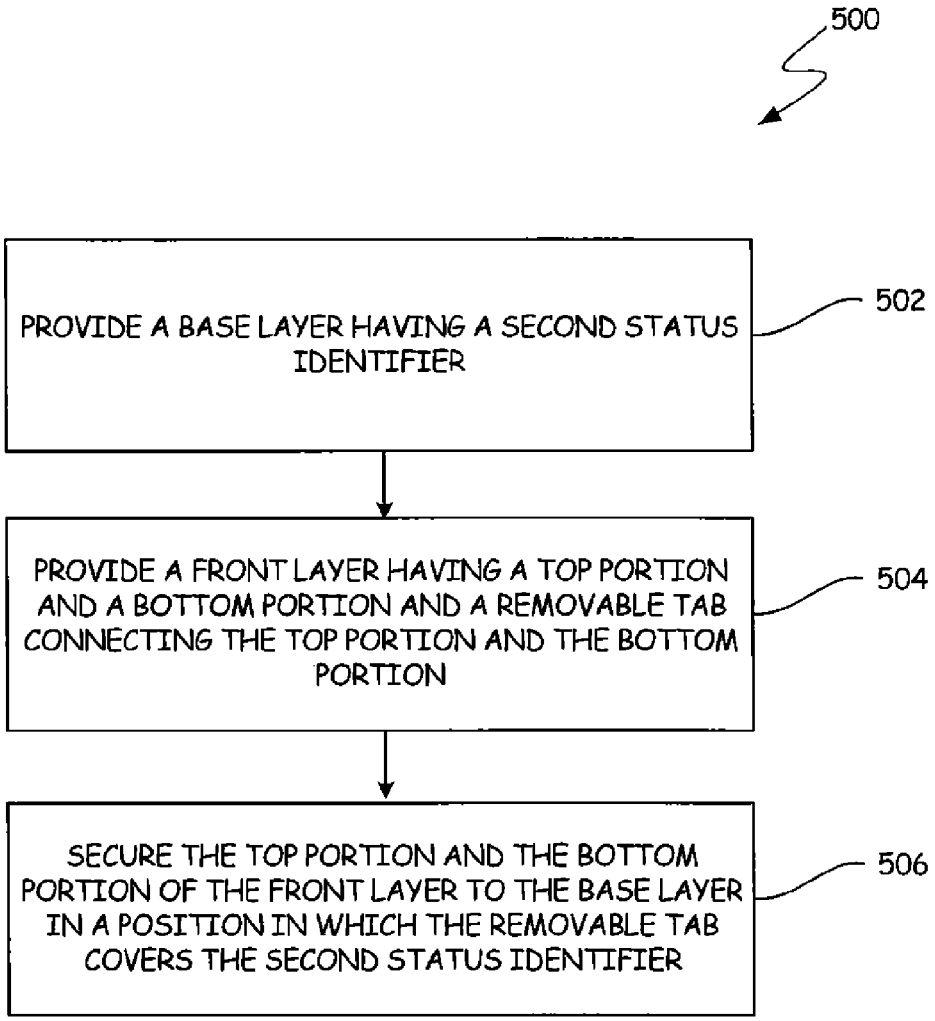
FIG. 5 is a simplified flow diagram of a method embodiment.

FIG. 5 shows a simplified flow diagram 500 of a method of forming a tag for positioning on containers for carrying items(s). At step 502, a base layer having a second status identifier is provided. This is followed by step 504 at which a front layer having a top portion and a bottom portion and a removable tab connecting the top portion and the bottom portion is provided. The removable tab includes a first status identifier. At step 506, the top portion and the bottom portion of the front layer are secured to the base layer in a position in which the removable tab covers the second status identifier. The first status identifier is visible when the tab is retained to the front layer. The second status identifier is visible when the tab is removed.

Although the present invention has been described with reference to preferred embodiments, workers skilled in the art will recognize that changes may be made in form and detail without departing from the spirit and scope of the invention.

What is claimed is:

1. A tag for positioning on containers for carrying item(s), the tag comprising:

a base layer having a second status identifier that comprises a status identification symbol wherein the base layer has a second length and a second width; and a front layer having a first width and a first length, the front layer having a top portion and a bottom portion and a removable tab connecting the top portion and the bottom portion, the bottom portion and the top portion are secured to the base layer, wherein when the front layer is secured to the base layer, the removable tab covers the second status identifier, wherein the removable tab includes a first status identifier that is visible when the tab is retained to the front layer and wherein when the removable tab is removed the second status identifier is visible wherein the first width of the front layer is less than the second width along substantially all of the second length of the base layer and wherein the second length of the base layer is substantially the same as the first length of the front layer.

2. The tag of claim 1, wherein the base layer has a front surface and a back surface, and wherein the front layer is secured to the front surface of the base layer, and wherein a portion of the front surface of the base layer is visible when the front layer having the first width is secured to the front surface of the base layer having the second width.

3. The tag of claim 2, wherein the portion of the front surface of the base layer that is visible comprises a sequence identifier for removing the removable tab.

4. The tag of claim 1, wherein the removable tab is defined by an upper perforated line, across the first width of the front layer and located at a first connection junction between the removable tab and the top portion of the front layer, and a lower perforated line across the width of the front layer and located at a second connection junction between the removable tab and the bottom portion of the front layer.

5. The tag of claim 4, wherein the removable tab comprises a pull-up flap located on a side of the removable tab between the upper perforated line and the lower perforated line.

6. The tag of claim 5, wherein the pull-up flap is substantially semi-circular or semi-elliptical in shape.

7. The tag of claim 1, wherein both the first status identifier and the second status identifier are related to a cleanliness of the item(s).

8. The tag of claim 7, wherein each of the first status identifier and the second status identifier comprises at least one of a word identifier related to the cleanliness of the items or a color identifier related to the cleanliness of the items, and wherein the status identification symbol is an identifier for a bio-hazardous material.

9. The tag of claim 1, further comprising a backing layer removably secured to the base layer.

10. The tag of claim 1, further comprising a tag-reordering-information portion removably attached to at least one of the base layer or the front layer.

11. A tag for positioning on containers for carrying item(s), the tag comprising:

a base layer comprising a front surface and a back surface, the front surface having at least one of a first status identifier or a second status identifier, and the back surface having a first portion that is coated with an adhesive and a second portion that is not coated with the adhesive, such that only the first portion of the back surface is securable to other surfaces wherein the base layer has a second length and a second width; and a front layer having a first length and a first width, the front layer comprising a tab configured to be secured over the base layer, wherein when the tab is secured over the base layer, the tab covers one of the first status identifier or the second status identifier, and wherein the other one of the first status identifier or the second status identifier is visible wherein the tab comprises a pull-up flap located on a side of the tab wherein the flap has a first edge and a second edge and having an arcuate configuration extending from the first edge to the second edge wherein the first width of the front layer is less than the second width along substantially all of the second length of the base layer and wherein the first length of the front layer and the second length of the base layer are substantially the same.

12. The tag of claim 11, wherein the other one of the first status identifier or the second status identifier that is visible is included on the tab, and wherein the tab is removable to expose the covered one of the first status identifier or the second status identifier.

13. The tag of claim 11, wherein both the first status identifier and the second status identifier are included on the base layer, and wherein the tab is movable between a first position in which the tab covers only the first status identifier and a second position in which the tab covers only the second status identifier.

14. A method of forming a tag for positioning on containers for carrying items(s), the method comprising:

providing a base layer having a second status identifier that comprises a status identification symbol wherein the base layer has a second length and a second width providing a front layer having a first length and a first width, the front layer having a top portion and a bottom portion and a removable tab connecting the top portion and the bottom portion, wherein the removable tab comprises a first status identifier wherein the first width of the front layer is less than the second width along substantially all of the second length of the base layer, and wherein the second length of the base layer is substantially the same as the first length of the front layer; and securing the top portion and the bottom portion of the front layer to the base layer in a position in which the removable tab covers the second status identifier and the first status identifier is visible when the tab is retained to the front layer, and wherein when the tab is removed by gripping an arcuate flap extending from the tab such that the second status identifier is visible.

15. The method of claim 14, further comprising shaping a portion of the removable tab into a pull-up flap.

16. The method of claim 14, further comprising removably securing a backing layer to the base layer.

17. The method of claim 14, wherein each of the first status identifier and the second status identifier comprises at least one of a word identifier related to the cleanliness of the items or a color identifier related to the cleanliness of the items, and wherein the status identification symbol is an identifier for a bio-hazardous material.

18. The method of claim 14, wherein when the top portion and the bottom portion of the front layer are secured to the base layer in the position in which the removable tab covers the second status identifier, a portion of a front surface of the base layer is visible, and wherein the portion of the front surface of the base layer that is visible comprises a sequence identifier for removing the tab.

19. The method of claim 14, wherein the base layer is a permanent base layer that is cleanable.

*20. The method of claim 28 and further comprising:*

*securing the multi-layer label to the transportation cart or hand-held container, wherein the multi-layer label comprises:*

*the base layer having the second status identifier that is the bio-hazardous material indicator on a first surface and a pressure sensitive adhesive on a second surface thereof, and*

*the top layer secured to the first surface of the base layer and covering the bio-hazardous material indicator, the top layer having the first status identifier thereon that is the non-bio-hazardous material indicator such that the non-bio-hazardous material indicator is visible on the cart or container.*

*21. The method of claim 20, wherein removing the top layer comprises separating the top layer from the base layer via a pull-up flap located on a side of the top layer.*

*22. The method of claim 20, wherein a portion of the front surface of the base layer is visible when the top layer is secured to the front surface of the base layer.*

*23. The method of claim 22, wherein the portion of the front surface of the base layer that is visible comprises a sequence identifier for removing the top layer.*

*24. The method of claim 20, wherein the top layer comprises a removable tab defined by an upper perforated line, across a width of the front layer and located at a first connection junction between the removable tab and a top portion of the top layer, and a lower perforated line across the width of the top layer and located at a second connection junction between the removable tab and a bottom portion of the top layer.*

*25. The method of claim 24, wherein a pull-up flap is located on a side of the removable tab between the upper perforated line and the lower perforated line.*

*26. The method of claim 20, further comprising removing a backing layer secured to the base layer to expose the pressure sensitive adhesive for securing the label to the surface of the cart or container.*

*27. The method of claim 20, further comprising a tag-reordering-information portion removably attached to at least one of the base layer or the top layer.*

*28. A method of updating a bio-hazardous status of a transportation cart or a hand-held container for bio-hazardous contents identification in a medical clinic or hospital, the method comprising:*

*updating the status identification from a first status identification that is a non-bio-hazardous status indicator to a second status identification that is a bio-hazardous status indicator after bio-hazardous materials have been placed in the cart or container by removing a top layer having the non-bio-hazardous status indicator thereon, from a base layer of a multi-layer label wherein prior to removing the top layer, the top layer covers the bio-hazardous status indicator displayed on a front surface of the base layer of the multi-layer label and wherein removing the top layer makes visible the bio-hazardous status indicator.*

*29. The method of claim 28, wherein each of the first status identifier and the second status identifier comprises at least one of a word identifier related to the cleanliness of the items or a color identifier related to the cleanliness of the items, and wherein the status identification symbol is an identifier for a bio-hazardous material.*

*30. The method of claim 28, and further comprising removing a backing layer secured to the base layer to expose a pressure sensitive adhesive for securely applying the label to the cart or container.*

* * * * *